Jan. 8, 1924.

E. S. BOUGHTON 1,479,979

RATING DEVICE

Filed May 7, 1919

WITNESS

H. Woodard

INVENTOR

Elbert S. Boughton

BY

ATTORNEYS

Jan. 8, 1924. 1,479,979
E. S. BOUGHTON
RATING DEVICE
Filed May 7, 1919 3 Sheets-Sheet 2

Jan. 8, 1924.

E. S. BOUGHTON 1,479,979

RATING DEVICE

Filed May 7, 1919

Witness
H. Woodard

Inventor
By Elbert S. Boughton
Attorneys

Patented Jan. 8, 1924.

1,479,979

UNITED STATES PATENT OFFICE.

ELBERT S. BOUGHTON, OF NEW YORK, N. Y.

RATING DEVICE.

Application filed May 7, 1919. Serial No. 295,480.

*To all whom it may concern:*

Be it known that I, ELBERT S. BOUGHTON, a citizen of the United States, residing in the borough of Manhattan, city, county, and State of New York, have invented a novel and useful rating device for the purpose of determining their availability and desirability for work or various associations; and for rating material and other things according to the quantity, degree, grade, or proportion of physical and other characteristics and their constituent phases which they possess for the purpose of determining their availability and desirability for certain uses, of which the following is a specification, reference being had to the accompanying drawings which form part thereof.

For convenience of illustration the invention and its various devices and features will first be more fully described as related to one of its uses with individuals, viz: as a method and means of and a set of related devices for ascertaining, measuring, recording and rating the desirable and undesirable mental, moral, physical and other personal and other characteristics and constituent phases of individuals including their natural and acquired aptitudes, attainments, proficiencies and other traits and attributes, (which said desirable and undesirable mental, moral, physical and other personal and other characteristics, and constituent phases, natural and acquired aptitudes, attainments, proficiencies and other traits and attributes are hereinafter referred to collectively as "characteristics"). The invention in this use of it, as stated above relates particularly (but not exclusively) to the method and means of and provides a set of related devices for ascertaining measuring, recording and rating those characteristics and phases which enter into the question of the individual's capacity, desirability and availability for public or private employment and for occupying or sustaining any other relationship to or association with others (which said capacity, desirability and availability for public or private employment and for occupying or sustaining any other relationship to or association with others are hereinafter referred to collectively as "qualification").

In order to give concreteness to the conception of "relationships" and associations which are not employments but in the consummation of which it is extremely desirable and necessary that each shall know the characteristics and qualifications of the other or others, the following forms of association are mentioned as illustrations,—partners in a joint enterprise, parties to contracts where they personally undertake to bring about certain results, manufacturers and producers of all sorts who entrust the disposition of their products especially their total output to jobbers, sales agents and the like, whose success depends upon the possession of certain qualifying characteristics, inventors in relating themselves to exploiters or others upon whose ability the production and sale of the invention depends; and in general, men of vision and imagination in associating themselves with men of affairs. Countless millions of exceptionally endowed and trained men have made failures of life because they did not make right relationships or associations such as these and their failures have been due largely to the lack of a simple, effective and inexpensive means of making them. The creation of the novel devices constituting this invention has been undertaken in part that the proper machinery may be provided for this purpose. This is preferably accomplished in part by the rating device or feature used in combination with the standard device or feature, the tracer table device or feature and the clearing house feature of the invention as hereinafter described.

A second object is to provide any individual with a simple, practicable and inexpensive method and means of and device for appraising his own characteristics and for securing adequate corroboration of that appraisal in order that he may know what quantity, degree, grade or proportion of each of such characteristics he possesses. This is preferably accomplished in part by the rating device or feature of the invention hereafter described.

A third object is to provide the individual with a rating so carefully and reliably prepared that it will constitute a complete certificate of his mental, moral, physical and other equipment for employment or association, convenient in form and easy to be understood, easily sized up by employers and others to take the place of the present fragmentary, inconclusive and unreliable basis for employment or association. This is accomplished in part by the rating device or feature of the invention used in combination with the standard device or feature hereinafter described.

A fourth object is to provide employers, administrative officers, instructors and others to whom it would be an advantage to know with exactness the characteristics of individuals and what quantity, degree, grade or proportion of such characteristics they possess and their qualifications with a simple, practicable and as near as possible infallible method and means of and device or devices for determining these facts. This is preferably accomplished in part by the standard device or feature used in combination with the rating device or feature of the invention as hereafter described.

A fifth object is to provide the individual with a method and means of and device or devices for ascertaining the occupations or associations for which he is best fitted with more infallible certainty than has heretofore been possible, whether or not he has previously engaged in those occupations or associations. This is preferably accomplished in part by the use of the tracer tables device or feature used in combination with the rating device or feature and the standard device or feature of the invention as hereinafter described.

A sixth object is to provide an individual seeking employment or association with a simple practicable inexpensive but effective method and means of and device or devices for securing such employment or associates.

A seventh object is to provide employers and others in need of help or persons seeking associates with a simple practicable, inexpensive but effective method and means of and device or devices for securing such help or associates.

An eighth object is to provide the country with an inexpensive, expeditious and effective method and means of and device or devices for stabilizing the supply of and demand for workers, or individuals for any form of association. The three objects last above set forth, viz: objects sixth, seventh and eighth are preferably accomplished in part by the "clearing house" feature of the invention in which are preferably largely employed the rating device or feature used in combination with the standard device or feature and deficiency statement device or feature of the invention as hereinafter described.

A ninth object is to provide the individual with a simple practicable and inexpensive method and means of and device or devices for ascertaining his deficiencies in characteristics or in qualifications as compared with the standards of employers, executive officers, instructors and others whose standard requirements such individual hopes to fully attain unto and to quickly and conveniently make up such deficiencies and secure proper credit therefor, and furnish such individual an incentive to round himself out and to climb from grade to grade in his chosen calling or association upon the basis of recognized merit. This is preferably accomplished in part by the deficiency statement device or feature used in combination with the rating device or feature and the standard device or feature of the invention as hereinafter described.

A tenth object is to provide a simple practicable and inexpensive method and means of and device or devices for ascertaining measuring, recording and rating by fine, discriminating grades the physical and other characteristics of material and other things of use and for affording to the users thereof a simple, practicable and inexpensive method and means of and device or devices for determining the availability and desirability of such materials and other things for any certain use from such ratings. This is preferably accomplished in part by the rating device or feature and the standard device or feature and the deficiency statement device or feature and combinations of these as hereinafter described.

Other objects will be in part obvious from the annexed drawings and in part indicated by the following analysis of the invention and its various devices.

The invention therefore consists of these several devices or features and their various relations to one another as well as their relation to the features of construction, combination of parts and unique relation of parts all as hereinafter outlined illustratively. To enable others more skilled in the art to fully comprehend the underlying features of the invention so that they can perform the same in apparatus or devices involving various modifications in structure and relation as well as in that herein specifically described without departing from the scope of the invention, drawings depicting a preferred form of the means and devices for carrying out the herein described invention have been annexed as part of this disclosure, throughout which similar reference characters denote corresponding parts.

In these drawings which are largely fragmentary and diagrammatic, and which are always to be understood as illustrating only a preferred form of the co-operating devices of my invention:

Figure 1 shows the page arrangement of the more or less abstract characteristics of the rating device.

Figure 2 shows the page arrangement of the more concrete characteristics of the rating device.

Figure 3 shows a portion of a sheet of the standard device superposed upon or in register with a page of the composite form of the rating device.

Figure 4 shows the deficiency statement device.

Figure 5 shows a portion of a page of the tracer tables device.

Referring now to these drawings in detail it is to be understood that the devices for carrying out this method preferably include a chart or rating in the form of a book or pamphlet made up of a page or pages of directions followed by a page or pages of more or less abstract personal characteristics (as exemplified in Figure 1). These characteristics are each preferably divided into two opposite phases which are arranged in separate columns, the positive or desirable phase in a column on one side of the page and the negative or undesirable phase in a column on the opposite side. Between these two columns is preferably a central ladder-like form with a per cent or quantity column on either side in which to insert a discriminating numeral preferably in the form of a per cent to represent the quantity degree, grade or proportion of the positive or desirable phase and the negative or undesirable phase of each characteristic which the individual under consideration possesses as exemplified in Figure 1, the two per cents of each characteristic when added together making 100. Preferably between these per cent columns and occupying the middle of the form, a succession of horizontal lines, one for each characteristic in the similitude of rounds of a ladder, each preferably broken for convenience into ten equal parts or divisions is provided as a means of graphically representing the quantity, degree, grade or proportion of each characteristic and phases thereof which the individual possesses. This is accomplished preferably by dividing the horizontal line in the proportions indicated by the per cents, by a vertical line (exemplified in Figure 1). The page or pages of more or less abstract characteristics are preferably followed by a page or pages similarly divided into columns similarly disposed, of more concrete characteristics such as "Attainments," "Education," "Experience," "Habits," "Physique" and the like and may preferably conclude with photographs and statistics intended to give the personal appearance of the candidate-for-rating (the general arrangement of which more or less abstract characteristics is exemplified in Figure 2).

The page or pages of more concrete characteristics are preferably followed by a page or pages of specialties similarly divided into columns similarly disposed, preferably reciting the aptitudes, proficiencies and attainments of the candidate-for-rating in each particular process in the occupation or occupations, special work, or associations he has engaged in, if any, and in the use of the tools, appliances, and machines, if any, entering in to the performance of the duties of such occupation, occupations, special work or associations, (the general arrangements of which pages is sufficiently exemplified by Figure 3). These three classes of characteristics of varying degrees of concreteness should preferably but not necessarily include every characteristic, mental, moral or physical, which to any great extent enters into the question of the qualification of the individual for work or association.

In actual use the candidate-for-rating preferably fills in the proper per cent column of the rating book of the per cent or proportion of the positive or desirable phase and the per cent or proportion of the negative or indesirable phase of each characteristic which he believes he possesses; then, by a vertical mark, divides the horizontal line, opposite each characteristic, in the same proportion thus graphically representing the result of his self appraisal (as is exemplified in Figure 1).

His self appraisal is then preferably corroborated by others who know him well which corroboration is preferably obtained by means of a rating book similar to the one filled out by the candidate-for-rating himself.

Neither the candidate-for-rating himself nor his corroborators are preferably required to pass judgment upon characteristics that are measurable, such as "quickness of movement", "physical strength," "keenness of the senses," and the like which are susceptible of ascertainment by measurements or by other approved scientific methods. If and when the corroboration has been satisfactorily completed the final rating preferably called the composite rating (has exemplified in Figure 3), containing the scientific determinations of measurable characteristics, and roughly, an average of the candidate-for-rating's own appraisal of himself with the appraisal of his several corroborators on each of the characteristics for which there is no reliable measure or test, to which are added photographs of the candidate-for-rating, is preferably made out on safety paper, each page signed by the candidate-for-rating. It is then delivered to him as his certificate of qualification for work or association.

With these charts or rating books of the individuals before them, employers, administrative officials, instructors and others needing to know the characteristics which these individuals possess and what quantity, degree, grade or proportion of such characteristics they possess are enabled almost at a glance at these pages of ratings to determine these facts.

However, in order to make the determination more simple, practicable and more nearly infallible, an entirely new method and means of and device for such determination has been created and made a part of the invention. This device may appropriately be called the "standard." It consists preferably of sheets of tracing cloth or other transparent substance upon which the various characteristics which appear on the pages of the rating book above described are reproduced in the identical relative positions as near as possible; so that, if the standard chart be laid in register upon the corresponding entries on the rating chart the two devices will coincide. Both can be seen at one glance (as exemplified in Figure 3 standard sheet A, rating sheet B.)

Such a standard is preferably provided for each occupation, special work or association. In the margin of each page the characteristics, some quantity, degree, grade or proportion of the phases of which is absolutely essential in individuals in such occupation, special work or association may be indicated by the letter "E" and those which while not absolutely essential are very desirable may be indicated by the letter "D" (as exemplified in Figure 3).

In the appropriate place in the per cent columns opposite each characteristic so specially indicated is preferably, though not necessarily, entered the per cent of the desirable and the per cent of the undesirable phase of that characteristic usually found in individuals engaged in that occupation, special work or association. It is permitted and expected that each user of these standards will make any changes he likes therein, to adapt them to his special needs. For instance, if a manufacturer has perfected and installed improved machinery requiring much greater alertness, much quicker observation, much quicker manipulation of material and quicker machine operation than is usual in that occupation, he may adjust his standards in these respects to his exact needs. The user preferably must however report such changes to the office which issued the standards so changed so that it will transpire that all changes found necessary to adapt the standards to the exact needs of the occupation or association the country over will thus be available for reference in preparing standards for future use and the standards will consequently thereafter exactly reflect the requirements of the occupations and associations as to the necessary qualifications for such work or associations and this invention will give to the industrial world, for the first time,
an exact ascertainment and record by fine, discriminating quantity, degree, grade or proportion marks of both the desirable and undesirable characteristics and phases thereof usually found in individuals engaged in each occupation, special work or association.

In actual use the standard chart is placed in register upon the corresponding pages of the rating chart of the individual whose characteristics and the exact quantity, degree, grade or proportion of the phases thereof it is desired to know in order to determine whether he is fitted for the occupation, special work or association under consideration. Any respects in which he fails to qualify are revealed at a glance.

In order to make more simple, practicable and infallible the determination as to what occupation, special work or association rates are best fitted for, an entirely new method and means of and device for such determination has been originated and made a part of this invention. This device may appropriately be called the tracer tables device. It consists preferably of a number of sheets ruled in the usual manner horizontally and divided by vertical lines into appropriate columns for entering the names or designations of occupations and associations, names of the special work within that occupation, a symbol for convenient reference purposes and a number of columns, preferably 25 for per cents and a final column for averages or grades (as exemplified in Figure 5).

This device is based upon and intimately related to the standard device, above described. In actual use when a standard is completed the per cents of its 25 high points, viz: the 25 essential characteristics having the highest per cents consequently the 25 characteristics which individuals engaged in that occupation, special work or association must possess in high degree are entered on one of these tracer table sheets. Upon the completion of the next standard, its 25 high points are similarly entered on the appropriate tracer table; care being taken to place all occupations requiring the same 25 high points on the same table. The per cents of these 25 high points for each occupation are added and averaged and the occupation, special work or association is thus given an exact grade so far as these high points are concerned.

In actual use when it is desired to ascertain for what occupation, special work or association an individual is best fitted, his 25 high points, as revealed by his rating book, are ascertained and averaged and the tracer table containing the occupations, special work and associations requiring those same 25 high points is referred to; the half dozen occupations requiring the same or the nearest grade of these 25 high points that the individual in question, possesses are noted. It would be quite safe to infer that he would do well in any occupation of the same or approximate grade upon the same 25 high points, but this invention does not stop at this approximate ascertainment. The actual standards for these half dozen selected occupations are then placed successively in register upon his rating book so that his fitness in every particular is tested and the one or more occupations for which he is best fitted are determined and the names thereof entered upon the front page of his rating book for the convenience of the ratee and others. By using this device, therefore, a very large proportion of the misfits in the industries, in associates, in education and elsewhere can be avoided.

The creation of these three novel devices;—the rating, the standard and the tracer tables was undertaken in part that they might serve as the machinery for a new, and inexpensive method on the one hand of securing for individuals, positions or associates for which they are exactly fitted and on the other hand of securing for employers and others, individuals who are exactly fitted to fill positions or relations they wish to have filled. This is brought about in part through the clearing house feature of the invention.

In actual practice, whenever an individual wishes a position or some certain associate, he preferably goes to the community central office where these devices are operated and, if not rated, becomes rated; then registers for the position or association he seeks. His rating is filed and he is registered and placed on the list of registrants of the same exact grade in that occupation or association.

Similarly when the users of the standards desire employees or associates they go to the community central office and make their wants known, the office copy of their standard, corrected as above described, is averaged and graded and all the ratings of registrants for that occupation or association of the exact grade required are produced and placed successively beneath the standard and the ones found to most nearly fulfill the requirements are selected, thus the employer or individual seeking an associate is saved the cost and trouble of advertising or otherwise seeking and interviewing large numbers of individuals who are, many times, in no way fitted for the vacant position or relation.

The creation of these three novel devices was also undertaken in part that they might serve as the machinery for a new and inexpensive method of stabilizing the labor market. In actual practice this is preferably accomplished as follows: As soon as a community finds that it has a persistent surplus of labor, that surplus by occupations and exact grades is reported by the community central office to the State or next higher central office; and, unless speedily absorbed in that larger district is, in turn, with other such surplus, reported to the regional or next higher central office; and unless speedily absorbed in that larger region is in turn, with other such surplus reported to the national central office. From the national central office a daily report is preferably sent to each community central office, giving all districts of surplus of help and all districts of scarcity of help in every occupation and association and of every grade. The community central office where there is a surplus of help in the occupation and of the exact grade required elsewhere, notifies registrants in that occupation and grade in that community of the districts of scarcity. If any of these registrants wish to be considered for positions or associations in other districts they order a copy of their ratings to be made and sent to the district of scarcity of help. It transpires, therefore, that upon the occurrence of a scarcity of help in any district, a stream of ratings soon begins to flow in from districts of surplus which ratings are practically as available to those seeking help or associates there for the purpose of selection as though the ratees resided in that community and as careful selection is possible. Similarly the employer or seeker for an associate in the district of scarcity may take the initiative if he chooses and make requisition for the help or associate he needs upon the district of surplus. All that is required is that he instruct his community central office to send by wire or otherwise to such district of surplus, a requisition stating the name or symbol of the occupation or association and grade of help or associate required, salary offered etc. and a memo. of the respects in which his standard has been changed from the general standard for that occupation or association. Upon receipt of this data the office in the district of surplus of help can place the standard for that occupation or association, as so changed, in register, upon the ratings of registrants for that occupation or association and grade, on file in that office and make the best possible selection and, if so directed, send that registrant at once in response to the requisition or may get the registrant in immediate communication by wire or otherwise with the person making the requisition. It will be apparent that this novel and valuable feature is made possible or practicable only by this interchangeable standard device combined with the standardized ratings.

In order to provide a ratee with a simple practicable and inexpensive method and means of and device for making the necessary additions to, amendments of and other proper changes in his rating after it is issued, to keep pace with his changes in personal characteristics and qualification for work or association and to facilitate his ascertainment of his deficiencies as compared with the general standards of any occupation or association with the special standards of any particular employer or other standard user, the device appropriately called the deficiency statement has been originated and made a part of this invention. It consists preferably of a chart or sheet, having series of blanks for the entry of the name of the standard user and his representative, if any: the name and address of the ratee, the number of the particular standard, the number or symbol for the occupation for which this is a standard, the number, the general and the special grade of ratee's rating; brief directions and other like data also two main sections or divisions of the chart, one for the entries on the general rating and another for entries on the special rating. In both the general and special rating divisions, columns are provided for the entry of the number of the item or characteristic as it appears in the rating book and standard concerning which item a deficiency is revealed, the employer's per cent of requirement for that characteristic, the per cent the rating shows ratee possesses of that characteristic; the per cent of deficiency and the date when it is made up and cancelled. At the foot of the device is preferably a set of horizontal lines for the decision, if any, of the employer or other person applied to.

This device, in its use, is therefore based upon and intimately related to the "rating" device and the "standard" device.

In one of its uses, employers, administrative officials, instructors and other such users of the standards are provided with these deficiency statement devices preferably in carbon sheet pads whereby an original and an identical copy is produced at one writing.

When applicants come to them with ratings, the standard for the position applied for is placed in register upon the rating book, page by page, and the deficiences thus revealed are entered on the deficiency statement device, as above described and the employer's decision, is added as for instance that "The applicant will be given the position on probation and will be given 90 days in which to make up the deficiency or deficiences shown," or that "The application is refused but will be reconsidered if within 90 days the applicant makes up the deficiency or deficiences shown and returns with the rating book showing that they have been satisfactorily made up."

In another of its uses, ratees come to the community central office; or, if they live at a distance, they send their rating there with the request that it be tested by the general standard of some chosen occupation or with the request that it be tested by the standard of some particular employer (to whom perhaps the ratee is contemplating making application for a position) in order that the ratee may know beforehand what his deficiencies are and have opportunity to make them up. In this use the deficiency statement device is provided for recording and placing at the disposal of the ratee the deficiencies revealed.

In still another of its uses a rated student in any educational course, may, at any time and as many times as he likes, test himself either by any standard of scholastic requirements or by the standard of any occupation or association for which he is fitting himself or concerning which he wishes to know his fitness.

The above preferred form of application of the method and means of and devices for carrying out the herein described invention is only one of many applications and uses of the several devices and only one of the many applications and uses for which the invention as a whole is intended. It will be obvious that the principles involved and the devices for applying the same are, with appropriate modifications, applicable as well to ascertaining, measuring, recording and rating and to determining from the rating other things about individuals and the physical and other characteristics of material and other things; as, for example, the material to enter into contract work, and into construction operations generally, the raw material and fabrics and fabricated things entering into manufacture and other such processes, the commodities and other things which are the subjects of commerce and merchandising, the desirable and undesirable characteristics, features, appurtenances and other things about real estate, including farms and vacant property, about apartments, suites, residences and other living quarters, about manufacturing plants, office and other business properties and many others.

What I claim and desire to secure by Letters Patent is:—

1. In a rating device a rating chart, indicating the degree to which an object possesses certain characteristics, a second chart indicating by similar means the standard of requirement of such characteristes, and means for contrasting the indications on the two charts for comparing the characteristics of the object with the standard requirements.

2. In a rating device a rating chart, indicating, by graphic means, the degree to which an object possesses certain characteristics, a second chart indicating by similar graphic means the standard of requirements of such characteristics, and means for contrasting the indications on the two charts for comparing the characteristics of the object with the standard requirements.

3. A rating device comprising a rating chart, indications on said chart to show the extent to which an object possesses certain characteristics, and another chart bearing indications established according to a predetermined standard and adapted to cooperate mechanically with the rating chart, when superimposed thereon to graphically indicate the difference between the characteristics of the object and the standard requirements.

4. A rating device comprising a rating chart, indications on the said chart for denoting the extent to which an object possesses certain characteristics, a cooperating transparent chart, indications on the said transparent chart marked according to a predetermined standard, the indications on the said charts being adapted to register together when the transparent chart is superimposed on the rating chart, to graphically indicate the differences between the characteristics of the object and the standard requirements.

5. A rating device for graphically contrasting the characteristics of objects, comprising a chart provided with a scale for the characteristics and adapted to receive marks indicating by their position on the scale the extent to which the corresponding characteristics are possessed by the object, and a cooperating device to graphically contrast the same with a predetermined standard.

6. A rating device for graphically contrasting the characteristics of objects comprising a rating chart provided with indications for the characteristics to be contrasted and adapted to receive marks indicating by their position the extent to which the corresponding characteristics are possessed by the object being rated and a cooperating device marked with indications according to a predetermined standard.

7. A rating device for graphically contrasting the characteristics of objects comprising a rating chart provided with indications for the characteristics to be contrasted and adapted to receive marks indicating by their position the extent to which the corresponding characteristics are possessed by the object being rated and a cooperating device comprising a transparent chart marked with indications according to a predetermined standard and adapted to be superimposed on the said rating chart to provide a graphic comparison of the indications of characteristics of the objects with the indications of requirements of the standard.

8. A rating device for graphically contrasting the characteristics of objects comprising a rating chart provided with indications for the characteristics to be contrasted and adapted to receive marks indicating by their position the extent to which the corresponding characteristics are possessed by the object being rated and a co-operating device comprising a transparent chart having indications corresponding in positions with those on the said rating chart and marked according to a predetermined standard.

9. A rating device for graphically contrasting the characteristics of objects comprising a chart consisting of a list of characteristics arranged in the form of a table with a space adjacent to each characteristic to receive an indication, and a co-operating device comprising a transparent chart arranged with a table in corresponding form and adapted to receive indications in the spaces adjacent the respective characteristics to be used as a standard of comparison, the table on the said transparent chart being adapted to register with the table on the said first mentioned chart when superimposed thereon to graphically contrast the indications of the characteristics of the object with the standard requirements.

10. A rating device for judging the qualifications of objects, comprising a rating chart adapted to receive marks indicating by their position the characteristics of the object and co-operating means, comprising a transparent chart marked according to a predetermined standard and adapted, when superimposed upon the rating chart, to contrast graphically the characteristics of the object with the standard requirements.

11. In a rating device, a tracer table comprising a table or chart having indications thereon to show the characteristics and the degree thereof required of an object, according to a predetermined standard, to qualify it for particular occupations, relationships or uses, and a rating chart of the object showing the extent to which the object possesses such characteristics, said rating chart being adapted to co-operate with the said tracer table to determine the occupation, relationship or use for which the said object is best qualified.

12. In a resting device of the character described involving standard charts for each occupation, relationship or use, and a rating chart for each object indicating the extent to which such object possesses the said characteristics, in combination, a tracer table wherein are associated the various occupations, relationship or uses which require substantially the same characteristics and in substantially the same degree, the said tracer table being adapted to co-operate with the said rating charts and standard charts to indicate the occupation, relationship or use for which the said object is best qualified.

13. In a rating device of the character described, comprising standard charts indicating the characteristics and degree thereof which it is desirable that an object possess to qualify it for certain occupations, relationships or uses, and a rating chart for each object indicating the extent to which such object possesses the said characteristics, a tracer table containing indications corresponding to the indications of said standard charts and adapted for use with said rating charts to determine the occupation, relationship or use for which said object is best qualified.

14. A rating device for graphically showing the extent to which the characteristics of an object or substance differ from the predetermined requirements with respect to such characteristics comprising cooperating parts, one part containing indications marking the extent to which the object or substance being rated possesses the said characteristics, and another part containing indications corresponding to the said predetermined requirements with respect to such characteristics, one or other of said parts being adapted to be superimposed upon the other and thereby to provide a graphic comparison of the indications contained on one part with the indications contained on the other.

In testimony whereof I have hereunto set my hand.

ELBERT S. BOUGHTON.